(12) United States Patent
Schellen et al.

(10) Patent No.: US 6,378,753 B1
(45) Date of Patent: Apr. 30, 2002

(54) GAS DISTRIBUTION SYSTEM WHICH CAN BE CONNECTED TO A GAS SUPPLY

(75) Inventors: Ralph Schellen, Krefeld; Jens Tauchmann, Berlin, both of (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/530,904
(22) PCT Filed: Nov. 3, 1998
(86) PCT No.: PCT/EP98/06964
 § 371 Date: Jun. 19, 2000
 § 102(e) Date: Jun. 19, 2000
(87) PCT Pub. No.: WO99/24209
 PCT Pub. Date: May 20, 1999

(30) Foreign Application Priority Data
Nov. 7, 1997 (DE) .......................... 197 49 185

(51) Int. Cl.⁷ .................... B23K 1/08; B23K 1/00; B23K 5/00; B23K 31/02
(52) U.S. Cl. ................ 228/37; 228/42; 228/219; 228/260
(58) Field of Search ............. 228/42, 37, 219, 228/260

(56) References Cited

U.S. PATENT DOCUMENTS

| | | | | |
|---|---|---|---|---|
| 4,321,031 A | * | 3/1982 | Woodgate | 432/11 |
| 4,651,916 A | * | 3/1987 | Ciniglio et al. | 228/37 |
| 5,044,542 A | * | 9/1991 | Deambrosio | 228/37 |
| 5,090,651 A | * | 2/1992 | Mittag | 228/219 |
| 5,161,727 A | * | 11/1992 | Leturmy et al. | 228/37 |
| 5,228,614 A | * | 7/1993 | Elliot et al. | 228/37 |
| 5,297,724 A | * | 3/1994 | Mehta et al. | 228/219 |
| 5,409,159 A | * | 4/1995 | Connors et al. | 228/219 |
| 5,509,598 A | * | 4/1996 | Nayar et al. | 228/180.1 |
| 5,520,320 A | * | 5/1996 | McKean et al. | 228/102 |
| 5,569,075 A | * | 10/1996 | Leturmy | 454/66 |
| 5,593,499 A | * | 1/1997 | Stans et al. | 118/63 |
| 5,722,581 A | * | 3/1998 | Sindzingre et al. | 228/206 |
| 5,725,143 A | * | 3/1998 | Leturmy | 228/37 |

FOREIGN PATENT DOCUMENTS

| | | | | |
|---|---|---|---|---|
| EP | 0527522 A1 | * | 2/1993 | 228/37 |
| JP | 2-229667 A | * | 9/1990 | 228/37 |

* cited by examiner

Primary Examiner—Tom Dunn
Assistant Examiner—L. Edmondson
(74) Attorney, Agent, or Firm—Connolly Bove Lodge & Hutz, LLP

(57) ABSTRACT

The invention relates to a gas distribution system which can be connected to a gas supply, the purpose of said gas distribution system being to admit and distribute a non-oxidizing gas in a shroud (17, 20, 21, 23) covering at least one solder container (22). Printed circuit modules (12) are transported through said shroud and while they are being transported, are brought into contact with a wave of solder (24). The gas distribution system has at least one gas distributor situated above and at least one gas distributor (19, 31) situated below the printed circuit modules (12) in order to produce a protective gas atmosphere with low residual oxygen values. Both gas distributors are provided with flow elements (48, 49, 51 to 56, 59; 35, 37, 44, 45). Said flow elements produce a displacement gas blanket which is distributed homogeneously over the discharge surfaces (59, 44, 45) directed towards the solder container.

16 Claims, 3 Drawing Sheets

$P1 > P2 > P3 > P4$

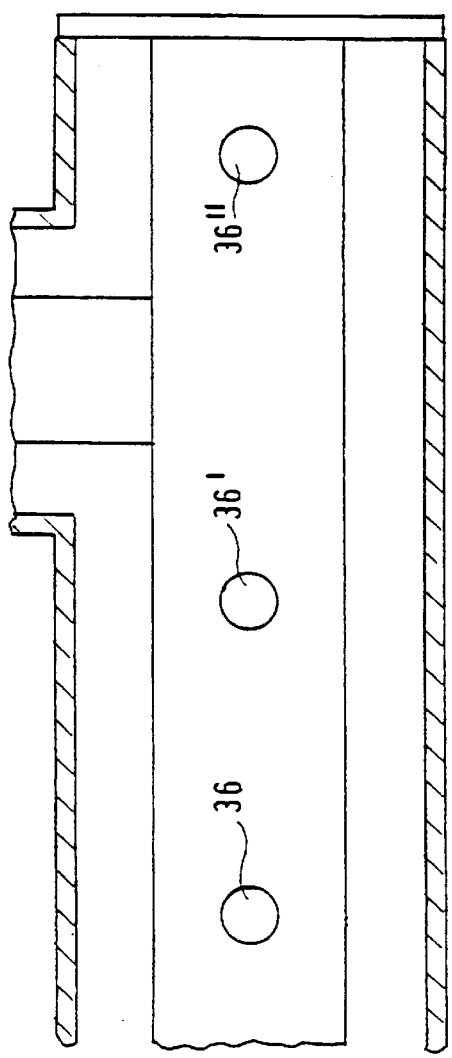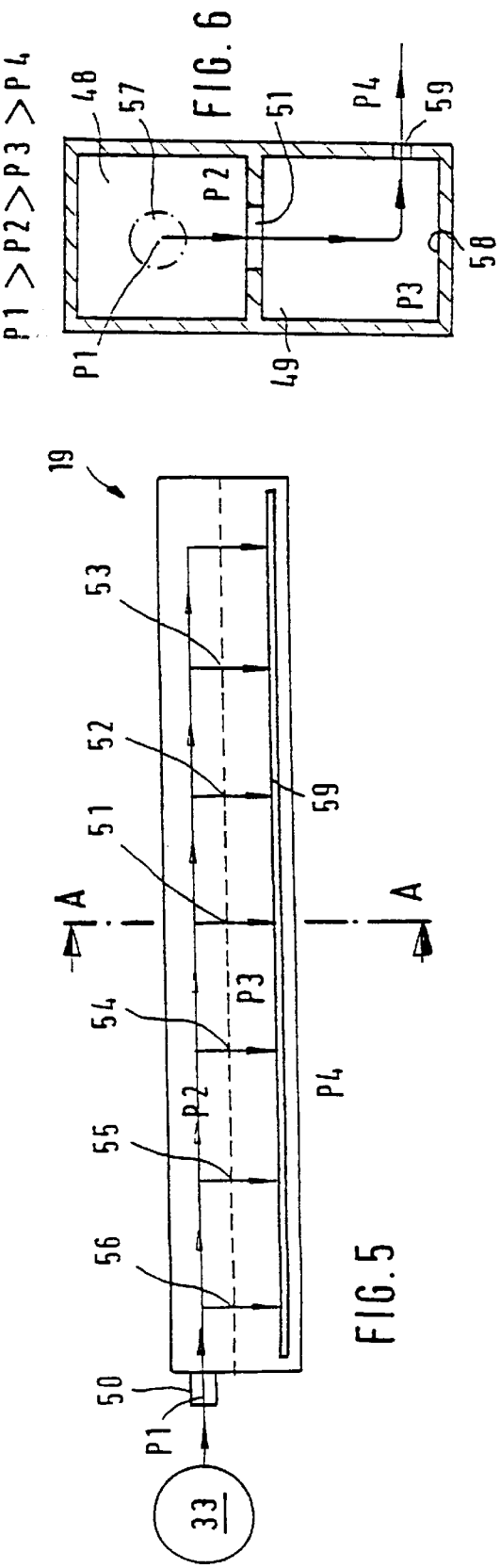

GAS DISTRIBUTION SYSTEM WHICH CAN BE CONNECTED TO A GAS SUPPLY

The invention relates to a gas distribution system, which can be connected to a gas supply, for admitting and distributing a non-oxidizing gas into a casing which covers at least one solder container and through which printed circuit boards are transported and, during their transport, are brought into contact with a solder wave.

When making flow-soldering systems inert, systems of different design and arrangement are used for the gas distribution. They have the task of making the casing of the solder container inert and hence of adapting the quality of the soldered connections to the increased requirements. With the use of inert gases, in particular nitrogen, the process windows can be adequately enlarged, the wetting can be improved and the formation of scale can be reduced.

In this case, an annular flow, which traverses the transport path of the printed circuit boards to be soldered, is produced via concentrated gas flows that can be directed (DE 42 19 913 A1). In EP 0 500 135 B1 the gas supply is preferably carried out at a limited rate, in order to flow out of the gas distributors in a laminar flow. Since the hood enclosing the solder container is of such a short design that the leading part of a circuit board can come into contact with the solder wave while the trailing part is projecting out of the inlet opening, first and second gas distributors supply non-oxidizing gases, which provide an atmosphere for the underside and the upper side of an incoming circuit board, and associate this with a solder wave. In a manner similar to this, the leading part of a circuit board may project out of the outlet opening while the trailing part is located in the solder wave. Second and third gas distributors therefore accordingly supply non-oxidizing gases. In DE 41 42 436 A1, on the other hand, a diffuser is arranged above the printed circuit boards.

All the current gas distribution systems are based on simple systems of the gas distributors. The inert gas passes via gas supplies to the gas distributor and is fed to the casing via pores (sintered metals or ceramic), according to DE 41 42 436 A1, or tubular openings, according to EP 0 500 135 B1. Gas distributors which have only one chamber with pores, do not have a homogeneous distribution of the inert gas over the pores. Gas distributors having bores or slots at the surface release the inert gas by forming a free jet. This leads to a directed flow. Because of the free-jet principle, the surrounding atmosphere is sucked in. This leads to directed flows and turbulence in the casing and, as a consequence of these directed flows or this turbulence, mixing of the inert gas with oxygen takes place, and the amount of inert gas needed to achieve a required residual oxygen content value becomes correspondingly greater. The gas distributor that is illustrated in EP 0 500 135 B1 comprises a gas supply pipe, a laminar flow being intended to flow out of the gas distributor, in order to suppress the formation of a free jet, as a result of the gas supply at a limited rate. This leads to long flooding times of the casing and to long reaction times in the event of the penetration of oxygen into the casing.

The diffuser made of sintered metal, which is proposed in DE 41 42 436 A1 certainly does not produce a directed flow, but emits the inert gas for this in all directions. In addition, sintered metal elements are susceptible to contamination.

The invention is based on the object of providing a gas distribution system, connected to a gas supply, by means of which large quantities of inert gas can be introduced into the casing, distributed over an area.

According to the invention, this object is achieved in that the gas distribution system has at least one gas distributor arranged above and at least one gas distributor arranged below the printed circuit boards, both being provided with flow means which form a displacement-gas cushion that is distributed homogeneously over the exit areas of the two gas distributors that are directed towards the solder container.

As a result of the fact that the gas distribution system has at least one gas distributor arranged above and at least one gas distributor arranged below the printed circuit boards, both being provided with flow means which form a displacement-gas cushion that is distributed homogeneously over the exit areas that are directed towards the solder container, two displacement-gas cushions are produced in the direction of the solder container and hence of the solder bath. The displacement-gas cushion that is produced by the gas distributor arranged underneath the printed circuit boards experiences a thermal deflection because of the heated solder. The displacement-gas cushion rising from the gas distributor arranged underneath the printed circuit boards is opposed by a displacement-gas cushion emerging from the other gas distributor in the direction of the solder bath, which suppresses any circulation. In this case, the two displacement-gas cushions mix, and a temperature equalization takes place. As a result of the formation of two displacement-gas cushions that emerge from the gas distributors in the direction of the solder bath, residual oxygen contents of less than 1000 ppm are achieved in less than 3 minutes, preferably less than 2 minutes.

As a result of the fact that the gas distributors have a first expansion chamber, which is connected to the gas supply and is connected via at least one opening to at least one further expansion chamber, in which the exit areas for the displacement-gas cushions are provided, the incoming gas flow is expanded in the first chamber and the pressure is reduced. Because of the pressure difference that builds up between the inlet pressure and the first chamber pressure, the inert gas is distributed homogeneously over the entire expansion chamber of the gas distributors. When emerging through the openings of the first expansion chamber, the pressure of the inert gas is reduced further and expanded into the second expansion chamber. The greater volume of the second expansion chamber allows the flow velocity and the pressure to be reduced. Furthermore, the second expansion chamber is used for the quietening and the distribution of the inert-gas flow, preferably of the nitrogen flow.

As a result of the fact that the opening is formed in a direction which is essentially perpendicular to the inlet of the gas supply, further expansion of the inert gas, a reduction in the flow velocity and the conversion of flow energy take place, since one wall of the second expansion chamber is located opposite the openings of the first expansion chamber, with the result that the directed inert-gas flow impinges on this wall, and the flow is thus broken and distributed over the space. By using a plurality of expansion chambers and appropriately arranging a plurality of openings between the first and second expansion chamber, a uniform distribution over the entire length of the gas distributor is advantageously achieved. In the process, any remaining inhomogeneities in the pressure distribution of the first expansion chamber are equalized via the distribution of the number and the size (cross section) of the openings.

A slot-like exit area that is arranged essentially perpendicular to or opposite the flow direction of the openings of the first expansion chamber enables the emergence of the displacement-gas cushion. The gas distributors extend at least over the length of the solder container, the slot-like exit areas being made over the entire length of the gas distributors and producing displacement-gas cushions which, following the emergence from the exit area, correspond to the dimensions of the slot-like exit areas and virtually do not mix with the surrounding atmosphere.

As a result of the fact that the gas distributor arranged under the printed circuit boards surrounds at least the solder wave, a displacement-gas cushion is produced at the point at which the inert gas must primarily be present, the displacement-gas cushion being directly thermally deflected as a result of the arrangement above the heated solder.

In the case of the gas distributor that is arranged under the printed circuit boards and surrounds at least the solder wave, the first expansion chamber is arranged with a spacing in the second expansion chamber, and the opening or the openings of the first expansion chamber open into the second expansion chamber in the direction of the printed circuit boards. One wall of the second expansion chamber is therefore opposite the openings, with the result that the directed and concentrated inert-gas flow impinges on this wall, and the flow is thus broken and distributed over the space. The openings vary in number and size (cross section) over the length of the gas distributor in such a way that a homogeneous gas distribution in the second expansion chamber is achieved. The inert gas, which is expanded and distributed over the U-shaped second expansion chamber, can now leave the gas distributor at the underside, opposite the opening, via slot-like exit areas arranged on both sides in relation to the first expansion chamber. The slot-like exit areas are not narrowed in relation to the dimensions of the second expansion chamber. The U-shaped second expansion chamber is bounded on the open side by the first expansion chamber, the interspace forming the second expansion chamber.

Advantageous developments are specified in the subclaims.

An exemplary embodiment of the invention is illustrated in the drawing and is described in more detail below.

FIG. 4 shows a schematic longitudinal sectional illustration of a detail of the gas distributor illustrated in FIG. 2

FIG. 5 shows a schematic illustration of the gas distributor arranged above the printed circuit boards FIG. 6 shows a section AA along the section line drawn in FIG. 5.

Figure 1:
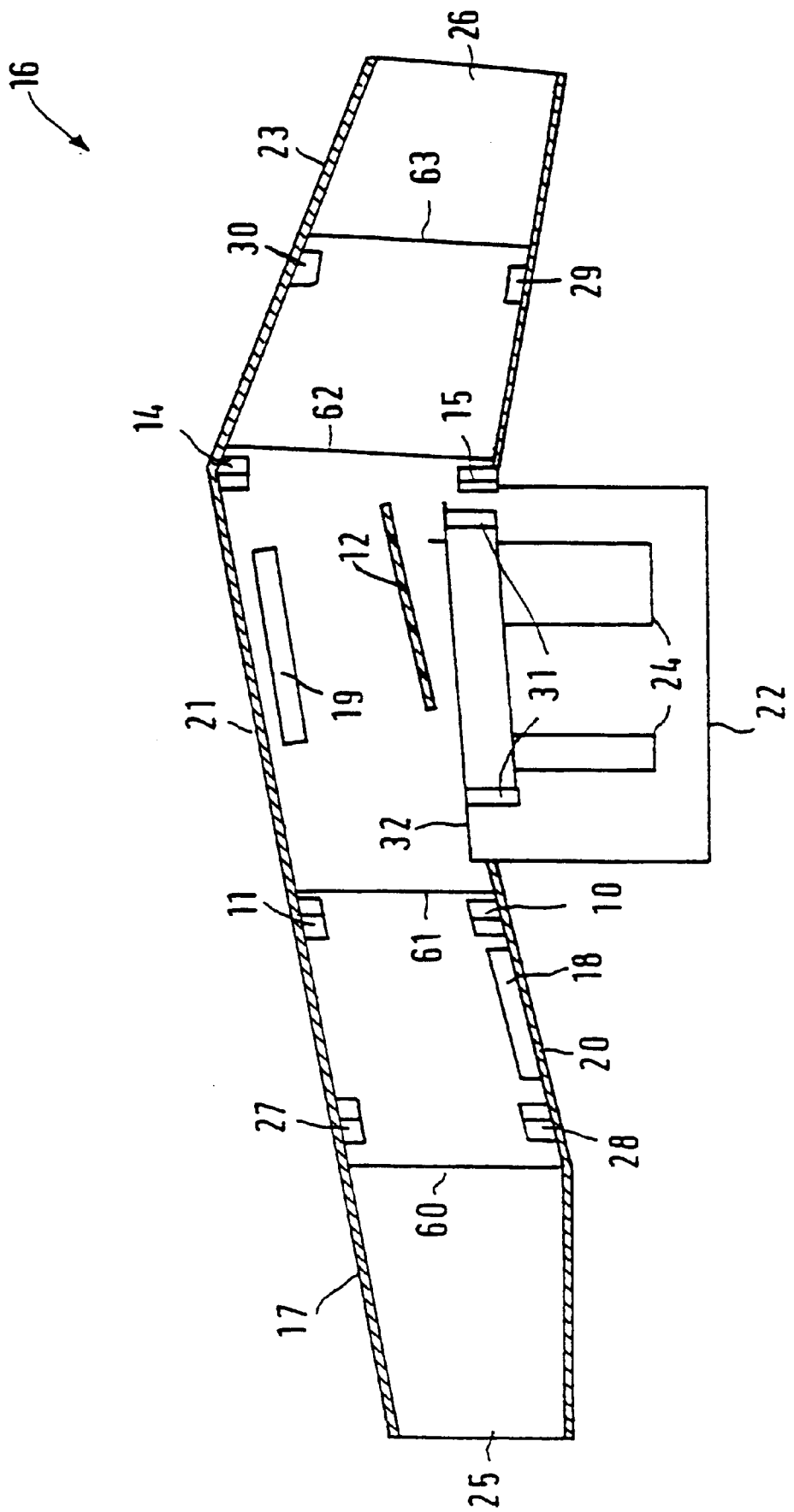
FIG. 1 shows a schematic illustration of a casing of a solder container with a gas distribution system

A soldering apparatus 16 is illustrated schematically in section in FIG. 1, and essentially comprises an inlet tunnel 17, an entry tunnel 20 which can include heating means 18, a hood 21 enclosing the solder container 22, and an outlet tunnel 23. In the present case, the casing is understood to be at least the hood 21 covering the solder container 22. The solder wave is designated by 24 and a circuit board by 12. The circuit board 12 is transported through the casing 17, 20, 21 and 23 and, during its transport through the casing, is brought into contact with a solder wave 24 in the solder container 22. The casing contains an inlet 25 on an inlet side and an outlet 26 for the printed circuit boards on an outlet side. The inlet and outlet 25, 26 are preferably shielded from the environment by flaps 60, 61, 62, 63 and gas curtains. The nozzles 10, 11, 14, 15, 27, 28, 29, 30 are designed as slot nozzles, which produce narrow gas jets. In FIG. 1, in each case provision is made for two flaps 60, 61 and 62, 63 that seal off the inlet and outlet, and nozzles 10, 11, 27, 28 and 14, 15, 29, 30, which produce gas curtains and form locks. It goes without saying that a design having only one flap 61 or 62 and one gas curtain 10, 11 or 14, 15 is also possible.

Figure 2:
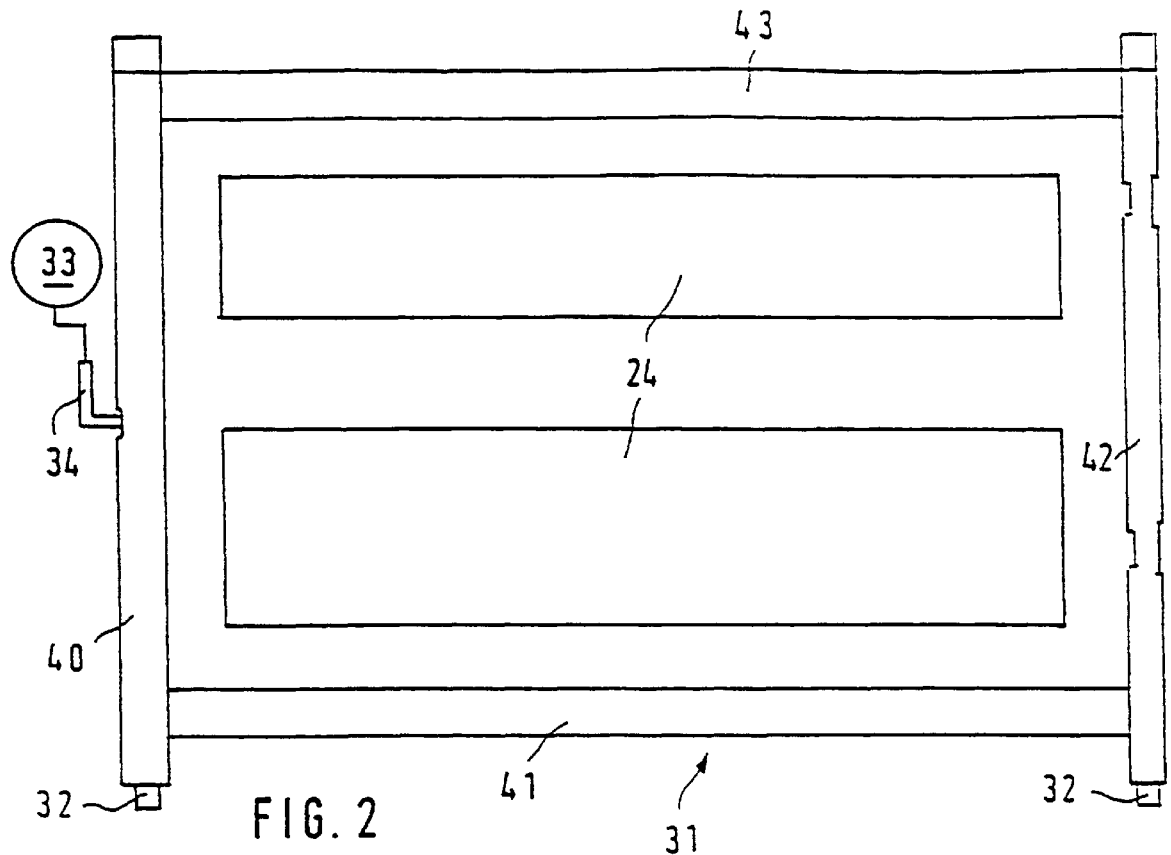
FIG. 2 shows a schematic plan view of the gas distributor arranged under the printed circuit boards

In FIGS. 1 and 2, there is a gas distributor 19 arranged above the circuit board 12, and a gas distributor 31, which surrounds the solder wave 24 and is arranged under the circuit board 12. The gas distributor 31 applies gas to the solder-bath surface and the solder waves 24. The gas distributor 31 encloses one or both solder waves 24 like a frame. The running off of the solder is not impaired by this gas distributor 31. The gas distributor 31 is placed on the solder container 22, one side of the gas-distributor 31 using the free board of the solder container 22 and resting on with support element 32 with an incline such that the printed circuit boards with the subassemblies to be soldered can be transported over the gas distributor 31. The gas distributor 31 does not dip into the solder bath. The gas distributor 31 is supplied with a non-oxidizing gas via the gas supply 33 and gas supply line 34.

Figure 3:
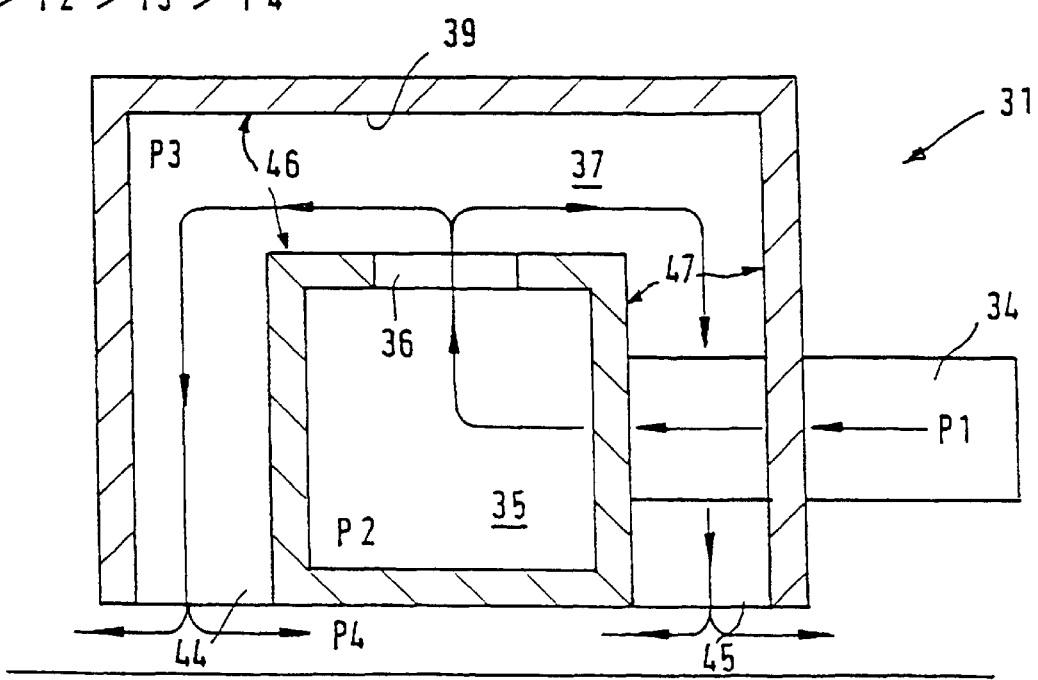
FIG. 3 shows a schematic sectional illustration of the gas distributor of FIG. 2

Illustrated schematically in FIG. 3 is a section through the frame-like gas distributor 31, identical parts being provided with identical reference numbers.

The gas distributor has a first expansion chamber 35, which is connected to the gas supply line 34. Via the gas supply line 34, inert gas passes from the gas supply 33 into the first expansion chamber 35. The gas supply line 34 is formed as a flexible, heat-resistant hose line, for example made of Teflon. The first expansion chamber 35 has individual openings 36, which are formed in a direction that is essentially perpendicular to the inlet of the gas supply line 34, and conduct the inert gas, offset by essentially 90° in relation to the flow or entry direction of the inert gas, into the second expansion chamber 37 or into the further expansion chambers. The second expansion chamber 37 is formed within a U-shaped frame that surrounds the first expansion chamber 35. In this case, the first expansion chamber 35 is arranged in the second expansion chamber 37 in such a way that the openings 36 of the first expansion chamber 35 open into the second expansion chamber in the direction towards the printed circuit boards 12. As a result of offsetting the inert gas by virtually 90° in relation to the flow or entry direction into the second expansion chamber 37, the inert gas is not forced into the adjacent second expansion chamber 37 as a result of an existing flow, but because of the pressure difference P1>P2>P3 that builds up. This has the advantage that the inert-gas flow is distributed homogeneously over the entire width and length of the gas distributor 31. When emerging through the openings 36 of the first expansion chamber 35, the pressure of the inert gas is reduced and expanded into the second expansion chamber.

One side wall 39 of the second expansion chamber is opposite the openings 36, with the result that the directed and concentrated inert-gas flow impinges on this wall 39, and the flow is thus broken and distributed over the space of the second expansion chamber 37. The result of this is the expansion of the inert gas, a reduction in the flow velocity and the conversion of flow energy. The flow cross section in the second expansion chamber 37, which is greater than the openings 36, further reduces the flow velocity of the inert gas.

Illustrated schematically in FIG. 4 is a detail A from FIG. 2. The gas distributor 31 surrounds the solder wave 24 on four sides, each arm 40, 41, 42, 43 (FIG. 2) forming, in flow terms, an expansion chamber in which the arrangement of the openings 36, 36' and 36", in particular their spacing, the number of openings 36, 36' and 36" and their cross section are formed in flow terms such that a homogeneous distribution over the entire gas distributor 31 is achieved. Inhomogeneities in the pressure distribution in the first expansion chamber 35 are equalized via the distribution of the number and size of the openings 36, 36', 36". The inert gas, which is expanded and distributed via the gas distributor 31, can now leave the gas distributor at the underside, that is to say at the side of the gas distributor 31 opposite the circuit board, via slot-like exit areas 44, 45 that are arranged on both sides of the first expansion chamber 35. The exit areas 44, 45 are not narrowed in relation to the flow ducts 46, 47 of the second expansion chamber 37.

The displacement-gas cushion formed in this way displaces the atmosphere surrounding the gas distributor. The entire region of the solder container 22 is flooded with a non-oxidizing gas, without any mixing with the surrounding atmosphere taking place.

Illustrated schematically in FIG. 5 is the gas distributor 19 that is arranged above the printed circuit boards 12. The gas distributor 19 comprises a first expansion chamber 48 and at least one further expansion chamber 49. The supply to the first expansion chamber 48 is performed via the gas supply line 50, which is connected to the gas supply 33. Valves provided in the supply line 50 are not illustrated and are also not described in more detail below. The gas supply line 50 is designed as a pipeline or hose line. Provided between the first expansion chamber 48 and the second expansion chamber 49 are a multiplicity of openings 51 to 56, which connect the first expansion chamber 48 to the second expansion chamber 49. The incoming inert-gas flow is expanded in the first expansion chamber 48. This expansion chamber 48 has the volume necessary for the expansion. The entry opening 57 is designed and arranged in such a way that the inert gas is distributed over the entire expansion chamber 48. The openings 51 to 56 that are provided in the first expansion chamber 48 are formed essentially perpendicular to the inlet 57 of the gas supply 33, with the result that the inert gas is conducted into the further expansion chamber(s) in a manner offset by 900 in relation to the flow or entry direction.

When emerging through the openings 51 to 56 of the first expansion chamber 48, the pressure P1>P2 of the inert gas, already reduced in the first expansion chamber 48, is further reduced, P1>P2>P3. One wall 58 of the second expansion chamber 49 is opposite the openings 51 to 56, with the result that the concentrated inert-gas flow passing through the openings 51 to 56 impinges on this wall 58, and the inert-gas flow is broken and distributed in the space of the second expansion chamber. As a result of the large openings 51 to 56, the formation of directed flows is largely suppressed.

The second expansion chamber 49 has a volume which allows a reduction in the flow velocity and in the pressure P2>P3. In the second expansion chamber 49, the inert gas is quietened and distributed homogeneously.

An exit area 59 that is formed essentially perpendicular to the openings 51 to 56 and is arranged at about 90° in relation to the flow direction of the openings 51 to 56 of the first expansion chamber is used to leave the gas distributor 19. The slot-like exit area is designed over the entire length of the gas distributor and produces a displacement-gas cushion which, following the emergence from the gas distributor 19, corresponds to the dimensions of the slot-like exit area 59 and virtually does not mix with the surrounding atmosphere.

After changing the expansion chamber volumes and the slot width, the gas distributor 19 is used as a slot nozzle 10, 11, 14, 15, 27, 28, 29, 30 for the gas curtains.

During the use of the gas distributors 19, 31, inert gas, in particular nitrogen, is supplied to the gas distributors 31 and 19. The inert gas flows into the first expansion chamber 35, is expanded to the pressure P2 and flows through the openings 36 into the second expansion chamber 37. The inert gas flows out in the direction of the solder surface at the pressure P3, in so doing experiences a further pressure reduction P4 and floods the region of the solder container 22 and the solder wave region 24. The inert gas is heated by the hot solder bath and rises. Inert gas flows in the direction of the solder container 22 through the gas distributors 19 that are fitted to the casing 21 above the printed circuit boards. Hence, the rising displacement-gas cushion is opposed by a displacement-gas cushion that propagates downward, and, which largely suppresses any circulation. At the same time, the two displacement-gas cushions mix and temperature equalization takes place.

What is claimed is:

1. A gas distribution system, which can be connected to a gas supply, for admitting and distributing a non-oxidizing gas into a casing which covers at least one solder container and through which printed circuit boards are transported and, during their transport, are brought into contact with a solder wave, wherein the gas distribution system has at least one gas distributor arranged above and at least one gas distributor arranged below the printed circuit boards, both gas distributors being provided with flow means which form displacement-gas cushions, that are distributed homogeneously over exit areas that are directed towards the solder container, wherein the gas distributors have a first expansion chamber which is connected to the gas supply and is connected via at least one opening to at least one further expansion chamber in which the exit areas for the displacement-gas cushions are provided, and said further expansion chamber having a greater volume than said first expansion chamber.

2. A gas distribution system, which can be connected to a gas supply, for admitting and distributing a nonoxidizing gas into a casing which covers at least one solder container and through which printed circuit boards are transported and, during their transport, are brought into contact with a solder wave, wherein the gas distribution system has at least one gas distributor arranged above and at least one gas distributor arranged below the printed circuit boards, both gas distributors being provided with flow means which form displacement-gas cushions that are distributed homogeneously over exit areas that are directed towards the solder container, wherein the gas distributors have a first expansion chamber which is connected to the gas supply and is connected via at least one opening to at least one second expansion chamber in which the exit areas for the displacement-gas cushions are provided, said second expansion chamber having a greater volume than said first expansion chamber, wherein the openings are formed in a direction that is essentially perpendicular to the inlet of the gas supply.

3. The gas distribution system as claimed in claim 1, wherein the exit areas are formed in a direction that is essentially perpendicular to or opposite the openings.

4. The gas distribution system as claimed in claim 1 wherein the gas distributor extends at least over the length of the solder container.

5. The gas distribution system as claimed in claim 1 wherein the gas distributor surrounds at least solder wave.

6. A gas distribution system, which can be connected to a gas supply, for admitting and distributing a non-oxidizing gas into a casing which covers at least one solder container and through which printed circuit boards are transported and, during their transport, are brought into contact with a solder wave, wherein the gas distribution system has at least one gas distributor arranged above and at least one gas distributor arranged below the printed circuit boards, both gas distributors being provided with flow means which form displacement-gas cushions that are distributed homogeneously over exit areas that are directed towards the solder container, wherein the gas distributors have a first expansion chamber which is connected to the gas supply and is connected via at least one opening to at least one second expansion chamber in which the exit areas for the displacement-gas cushions are provided, said second expansion chamber having a greater volume than said first expansion chamber, the exit areas being formed in a direction that is essentially perpendicular to or opposite the openings, the gas distributor extending at least over the length of the solder container, the gas distributor surrounding at least solder wave, wherein the first expansion chamber is arranged with a spacing inside the second expansion chamber, and the opening of the first expansion chamber opens into the second expansion chamber in the direction of the printed circuit boards.

7. The gas distribution system as claimed in claim 6 wherein the exit area of the second expansion chamber is formed on the side opposite the opening.

8. The gas distribution system as claimed in claim 7 wherein the second expansion chamber is formed in a U-shape, and the exit area is bounded on the open side by the first expansion chamber.

9. The gas distribution system as claimed in claim 8 wherein the gas distributor is arranged above the solder container in such a way that the displacement-gas cushion emerging from the exit area in the direction of the solder container experiences a thermal deflection over the solder bath.

10. A soldering apparatus for soldering printed circuit boards, having a gas distribution system as claimed in claim 1.

11. The gas distribution system as claimed in claim 1 wherein at least one of the gas distributors extends at least over the length of the solder container as viewed in the transport direction of the printed circuit boards.

12. The gas distribution system as claimed in claim 1 wherein at least one of the gas distributors surrounds at least one solder wave.

13. A gas distribution system, which can be connected to a gas supply, for admitting and distributing a non-oxidizing gas into a casing which covers at least one solder container and through which printed circuit boards are transported and, during their transport, are brought into contact with a solder wave, wherein the gas distribution system has at least one gas distributor arranged above and at least one gas distributor arranged below the printed circuit boards, both gas distributors being provided with flow means which form displacement-gas cushions that are distributed homogeneously over exit areas that are directed towards the solder container, wherein the gas distributors have a first expansion chamber which is connected to the gas supply and is connected via at least one opening to at least one second expansion chamber in which the exit areas for the displacement-gas cushions are provided, said second expansion chamber having a greater volume than said first expansion chamber, wherein the first expansion chamber is arranged with a spacing inside the second expansion chamber, and the opening of the first expansion chamber opens into the second expansion chamber in the direction of the printed circuit boards.

14. The gas distribution system as claimed in claim 5 wherein the exit area of the second expansion chamber is formed on the side opposite the opening.

15. The gas distribution system as claimed in claim 5 wherein the second expansion chamber is formed in a U-shape, and the exit area is bounded on the open side by the first expansion chamber.

16. The gas distribution system as claimed in claim 5 wherein the exit area of one of the gas distributors is arranged above the solder container in such a way, that a displacement-gas cushion emerging from the exit area in the direction of the solder container experiences a thermal deflection over the solder bath.

* * * * *